(No Model.)
C. W. FISHEL.
FLOUR OR MEAL BIN.
No. 392,793. Patented Nov. 13, 1888.
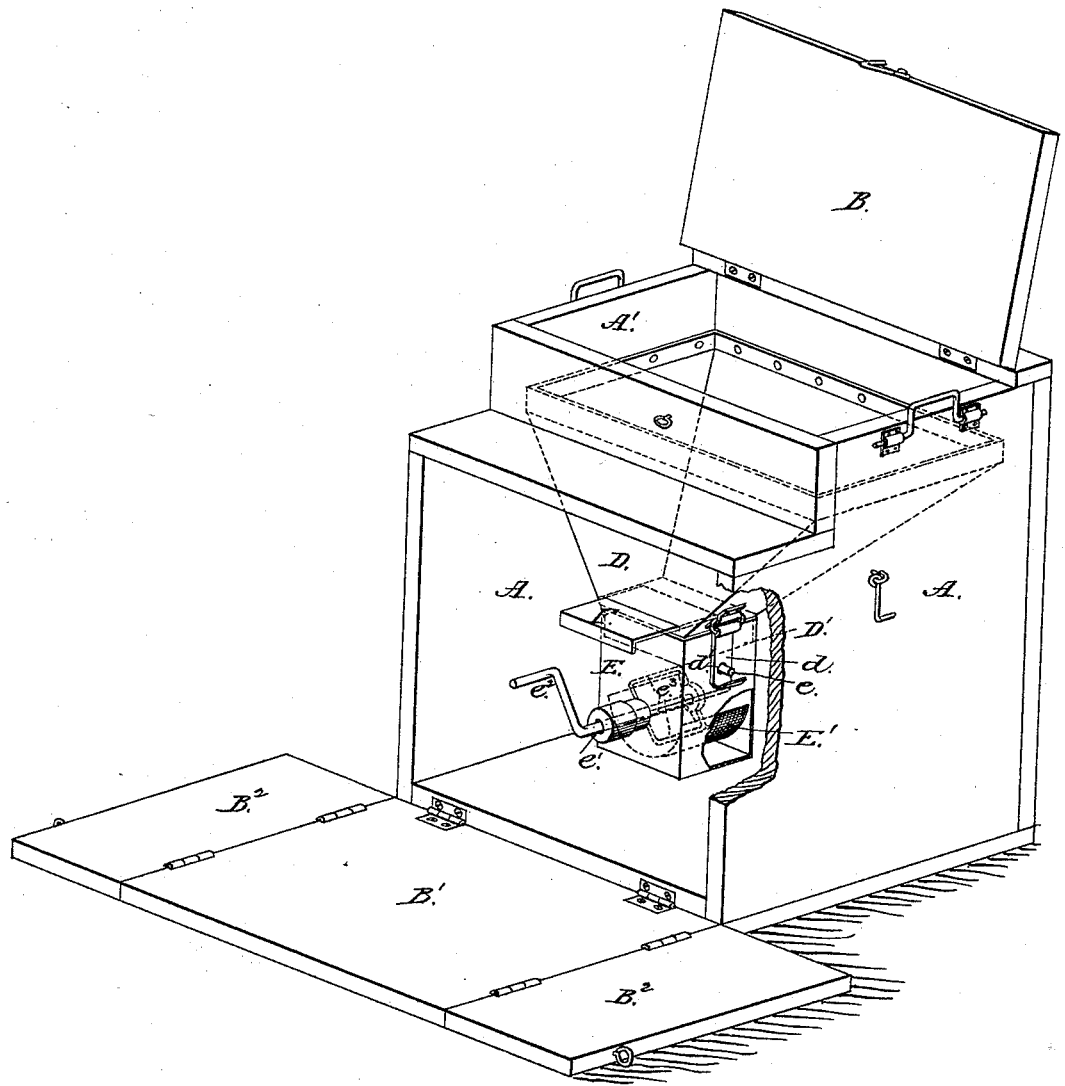
WITNESSES:
John A. Ellis
C. Sedgwick
INVENTOR:
C. W. Fishel
BY Munn & Co.
ATTORNEYS.

UNITED STATES PATENT OFFICE.

CHARLES W. FISHEL, OF FAIR PLAY, COLORADO.

FLOUR OR MEAL BIN.

SPECIFICATION forming part of Letters Patent No. 392,793, dated November 13, 1888.

Application filed April 20, 1887. Serial No. 235,472. (No model.)

*To all whom it may concern:*

Be it known that I, CHARLES W. FISHEL, of Fair Play, in the county of Park and State of Colorado, have invented a new and Improved Flour or Meal Bin, of which the following is a full, clear, and exact specification.

My invention relates to an improvement in flour or meal bins, and has for its object to provide a bin which will hold a convenient quantity of flour, wherein the said flour may be sifted as drawn from said bin, and wherein, further, the said bin may be readily cleaned, and when opened the door thereof will constitute a bread-board.

The invention consists in the construction and combination of the several parts, as will be hereinafter fully set forth, and pointed out in the claim.

Reference is to be had to the accompanying drawing, forming a part of this specification, in which the figure represents a perspective view of the bin partly broken away, with the lid up and the door open.

In carrying out the invention, the body A is made substantially rectangular in form, and provided with an upper extension, A', of less depth than the body proper, the rear and side walls of said body constituting the similar walls of the extension. The extension A' is provided with a hinged upwardly-folding top, B, and the front of the body A, which is open, with a door, B', hinged to the base, the said door being provided with leaves B², hinged to the sides thereof, adapted when the door is closed to fold at right angles against the sides of the body, when both the leaves and the door are held in a closed position through the medium of a hook pivoted to the body engaging an eye secured to the leaves, as shown, or other equivalent device.

The hopper D, adapted to hold the flour or meal, is preferably made of metal and secured to the sides of the extension A', the reduced end of said hopper terminating in a rectangular collar, D', centrally within the body A. Swinging arms $d$ are attached to each side of the hopper, extending below the collar D', where they are provided with one or more apertures, $d'$.

A rectangular receptacle, E, is slid over the collar D', which receptacle is provided upon opposite sides with pins $e$, adapted to enter the apertures $d'$ of the swinging arms $d$, whereby the receptacle E is detachably supported in engagement with the hopper D. The bottom of the receptacle E is composed of a wire-netting, E', suitable to screen the flour, and a shaft, $e'$, having a crank, $e^2$, integral with its outer end, is journaled in said receptacle, which shaft carries two or more arms, $e^3$, adapted when the shaft is revolved to engage the netting aforesaid.

Any form of sifter may be employed without departing from the spirit of the invention.

Above the collar D' from the front a slide, F, is passed into the hopper horizontally through a suitable slot, purposed, when the sifter is filled, to relieve the same from the weight of the mass above it, and, if found desirable, another slide may be provided above the said slide F. The slide is also employed when the one receptacle or screen E is removed to be replaced by one finer or coarser, as may be needed. When the door B' and leaves B² are swung down to a horizontal position, they are adapted for use as a bread-board. The entire body may be put together with screws in order that it may be knocked down and shipped flat, if desired.

From the foregoing description, read in connection with the drawing, the operation will be readily understood.

Having thus fully described my invention, what I claim as new, and desire to secure by Letters Patent, is—

The combination, with the body A, having an extension, A', a hinged top, B, the folding front B', provided with leaves B², hinged to its side edges and embracing the ends of the body when the front is closed, and the securing devices for said leaves, of the hopper supported within the body and provided with a suitable sieve, substantially as set forth.

CHARLES W. FISHEL.

Witnesses:
M. R. HANLIN,
I. S. SMITH.